(12) United States Patent
Tanaka et al.

(10) Patent No.: US 6,695,743 B2
(45) Date of Patent: Feb. 24, 2004

(54) VEHICULAR LOCKUP CLUTCH-EQUIPPED TRANSMISSION CONTROL APPARATUS AND CONTROL METHOD THEREOF

(75) Inventors: Hiroya Tanaka, Nishikamo-gun (JP); Daisuke Inoue, Toyota (JP); Kenji Matsuo, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/228,294

(22) Filed: Aug. 27, 2002

(65) Prior Publication Data

US 2003/0050150 A1 Mar. 13, 2003

(30) Foreign Application Priority Data

Sep. 13, 2001 (JP) ........................................ 2001-278184
Sep. 13, 2001 (JP) ........................................ 2001-278188

(51) Int. Cl.[7] ............................................. F16H 61/14
(52) U.S. Cl. ......................... 477/98; 477/902; 165/42; 165/43; 237/28
(58) Field of Search ....................... 165/42, 43; 237/28; 477/97, 98, 902

(56) References Cited

U.S. PATENT DOCUMENTS 6,537,178 B1 * 3/2003 Takizawa et al. ............. 477/76

FOREIGN PATENT DOCUMENTS

| JP | A 62-137467 | 6/1987 |
|----|-------------|--------|
| JP | A 2-261965 | 10/1990 |
| JP | U 5-83323 | 11/1993 |
| JP | A 2000-179670 | 6/2000 |

* cited by examiner

*Primary Examiner*—Ankur Parekh
(74) *Attorney, Agent, or Firm*—Oliff & Berridge, PLC

(57) ABSTRACT

A vehicular lockup clutch-equipped transmission control apparatus is applied to a vehicle that includes a heater apparatus for heating a cabin by heat from an engine, a transmission that transfers power between the engine and a wheel, and a heat exchanger that conducts heat exchange between the engine and the transmission. The control apparatus controls a lockup clutch that is disposed between the engine and the transmission and that mechanically connects and disconnects a path of power, in accordance with a state of operation of the vehicle. The control apparatus includes a controller that determines whether a heating capability requested of the heater apparatus is at least a first predetermined level based on parameter related to a temperature inside the cabin. If it is determined that the heating capability requested of the heater apparatus is at least the first predetermined level, the controller restricts engagement of the lockup clutch.

18 Claims, 11 Drawing Sheets

VEHICULAR LOCKUP CLUTCH-EQUIPPED TRANSMISSION CONTROL APPARATUS AND CONTROL METHOD THEREOF

INCORPORATION BY REFERENCE

The disclosure of Japanese Patent Application No. 2001-278184 filed on Sep. 13, 2001, and No. 2001-278188 file on Sep. 13, 2001, including the specification, drawings and abstract is incorporated herein by reference in its entirety.

BACKGROUND OF THE INVENTION

1. Field of the Invention

The invention relates to a vehicular lockup clutch-equipped transmission control apparatus and a control method thereof. More particularly, the invention relates to control regarding a cabin heater apparatus.

2. Description of the Related Art

Transmissions in which a torque converter for transmitting power via a fluid, such as oil or the like, is provided in a power transmission path between an engine and a wheel are adopted in many conventional vehicles, including motor vehicles and the like. A type of torque converter has a lockup clutch that is hydraulically driven so as to engage an input side and an output side of the torque converter. In this type of torque converter, the lockup clutch is appropriately engaged in accordance with the state of operation of the vehicle so as to reduce the deterioration of power transfer efficiency caused by transmission of power using fluid.

However, if the hydraulic oil used to drive the lockup clutch has low temperature, responsiveness deterioration occurs in the driving of the lockup clutch for engaging the input side and the output side of the torque converter. Due to such responsiveness deterioration and the like, shock occurs at the time of engagement of the lockup clutch, and therefore adversely affects drivability, particularly when the vehicle speed is low.

Therefore, Japanese Patent Application Laid-Open No. 2-261965 and No. 62-137467, as for example, indicate that when the hydraulic oil temperature is low or the engine cooling water temperature, which is a parameter related to the hydraulic oil temperature, is low, an operation region in which the lockup clutch is engaged is reduced by changing the region to a high-vehicle speed side. Furthermore, Japanese Utility Model Application Laid-Open No. 5-83323 proposes a technology in which a heat exchanger for exchange of heat between engine cooling water and the aforementioned hydraulic oil is provided in a vehicle and the hydraulic oil temperature is raised by the heat exchanger. This technology reduces the deterioration of low-vehicle speed drivability caused by responsiveness deterioration of the lockup clutch or the like.

In order to improve the engine fuel economy, it is preferable that the lockup clutch be engaged on as many occasions as possible. Therefore, according to the conventional art, the vehicle operation region in which the lockup clutch is engaged is expanded to a low-vehicle speed side as much as possible provided that drivability is not adversely affected.

However, if the lockup clutch is engaged on an increased number of occasions, the amount of heat produced by the engine at the time of the engine operation to output a predetermined vehicle drive power decreases because the engagement of the lockup clutch improves efficiency of power transfer between the engine and the wheels. Furthermore, if the hydraulic oil temperature is raised through heat exchange via the heat exchanger, the engine cooling water loses heat to the hydraulic oil. Therefore, in a vehicle equipped with a heater apparatus for heating the cabin by heat from the engine, the heating capability of the heater apparatus decreases on some occasions due to the aforementioned reduction in the amount of heat produced by the engine or the reduction in the amount of engine-originated heat that is available for the heating. Thus, there is a possibility of insufficient heating capability of the heater apparatus at the time of engine warm-up in wintertime, or the like.

In a vehicle equipped with a heat exchanger for the hydraulic oil (also termed ATF (automatic transmission fluid) warmer, or simply termed warmer), it becomes possible to operate the lockup clutch at an early stage, that is, a low-vehicle speed stage. However, if the lockup clutch is operated in an early stage, the amount of heat produced by the engine decreases as mentioned above, so that at the heater apparatus side, it becomes less easy to raise the temperature of a medium for heating air. Thus, the heating capability of the heater apparatus decreases. Hence, there is a possibility of insufficient heating capability of the heater apparatus when high heating capability is requested at the time of engine warm-up in wintertime and the like.

SUMMARY OF THE INVENTION

The invention has been accomplished in view of the aforementioned problems. It is an object of the invention to provide a vehicular lockup clutch-equipped transmission control apparatus capable of reducing deterioration of the heating capability of a heater apparatus while improving the engine fuel economy, and a control method thereof.

In order to achieve the aforementioned object, one aspect of the invention provides a vehicular lockup clutch-equipped transmission control apparatus which is applied to a vehicle that includes a heater apparatus for heating a cabin by heat from an engine, a transmission that transfers power between the engine and a wheel, and a heat exchanger that conducts heat exchange between the engine and the transmission, and which controls a lockup clutch that is disposed between the engine and the transmission and that mechanically connects and disconnects a path of power, in accordance with a state of operation of the vehicle. The control apparatus includes a controller that determines whether a heating capability requested of the heater apparatus is at least a first predetermined level based on a parameter related to a temperature inside the cabin, and that restricts engagement of the lockup clutch if it is determined that the heating capability requested of the heater apparatus is at least the first predetermined level.

According to another aspect of the invention, there is provided a vehicular lockup clutch-equipped transmission control method which is applied to a vehicle that includes a heater apparatus for heating a cabin by heat from an engine, a transmission that transfers power between the engine and a wheel, and a heat exchanger that conducts heat exchange between the engine and the transmission, and which controls a lockup clutch that is disposed between the engine and the transmission and that mechanically connects and disconnects a path of power, in accordance with a state of operation of the vehicle. In the control method, it is determined whether a heating capability requested of the heater apparatus is at least a first predetermined level based on a parameter related to a temperature inside the cabin. If it is determined that the heating capability requested of the heater apparatus is at least the first predetermined level, engagement of the lockup clutch is restricted.

If a design is made such that the occasion of engagement of the lockup clutch is increased in number or rate in order to improve the fuel economy of the engine, the efficiency of power transfer between the engine and the wheel improves. Therefore, the engine produces a reduced amount of heat, which is disadvantageous in securing a certain heating capability of the heater apparatus. However, according to the control apparatus and the control method described above, if the heating capability requested of the heater apparatus is at or above the first predetermined level, engagement of the lockup clutch is restricted, so that the aforementioned reduction in the amount of engine-produced heat is lessened. Therefore, it becomes possible to lessen the reduction in the heating capability of the heater apparatus while improving the fuel economy of the engine.

BRIEF DESCRIPTION OF THE DRAWINGS

The above mentioned and other objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description and the accompanying drawings, the present invention will be described in more detail with reference to exemplary embodiments.

First Embodiment

A first embodiment in which the invention is applied to a motor vehicle will be described with reference to FIGS. 1 to 4.

Figure 1:
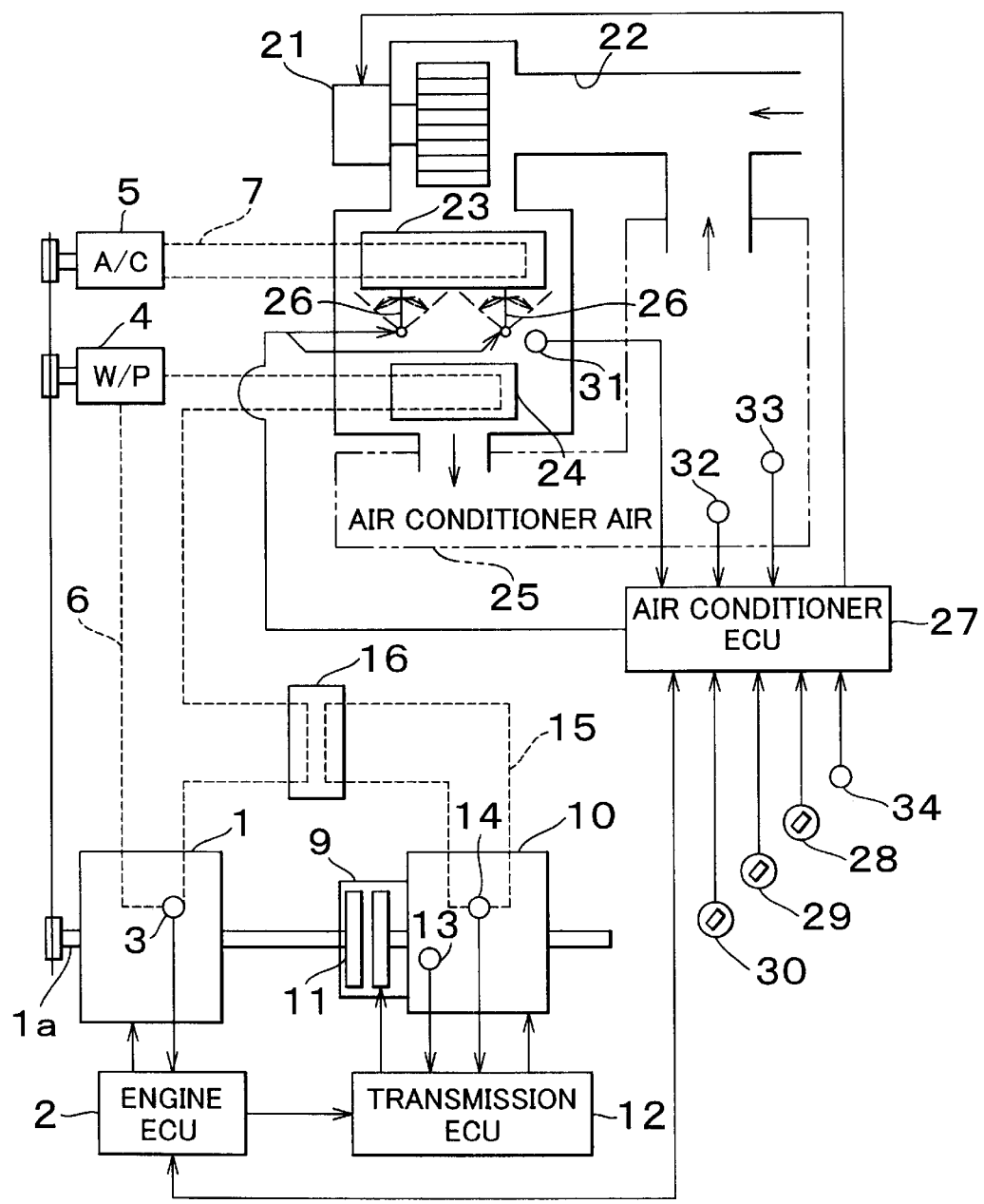
FIG. 1 is a schematic diagram illustrating an overall construction of a motor vehicle to which lockup clutch-equipped transmission control apparatuses in accordance with the first and second embodiments are applied.
Figure 2:
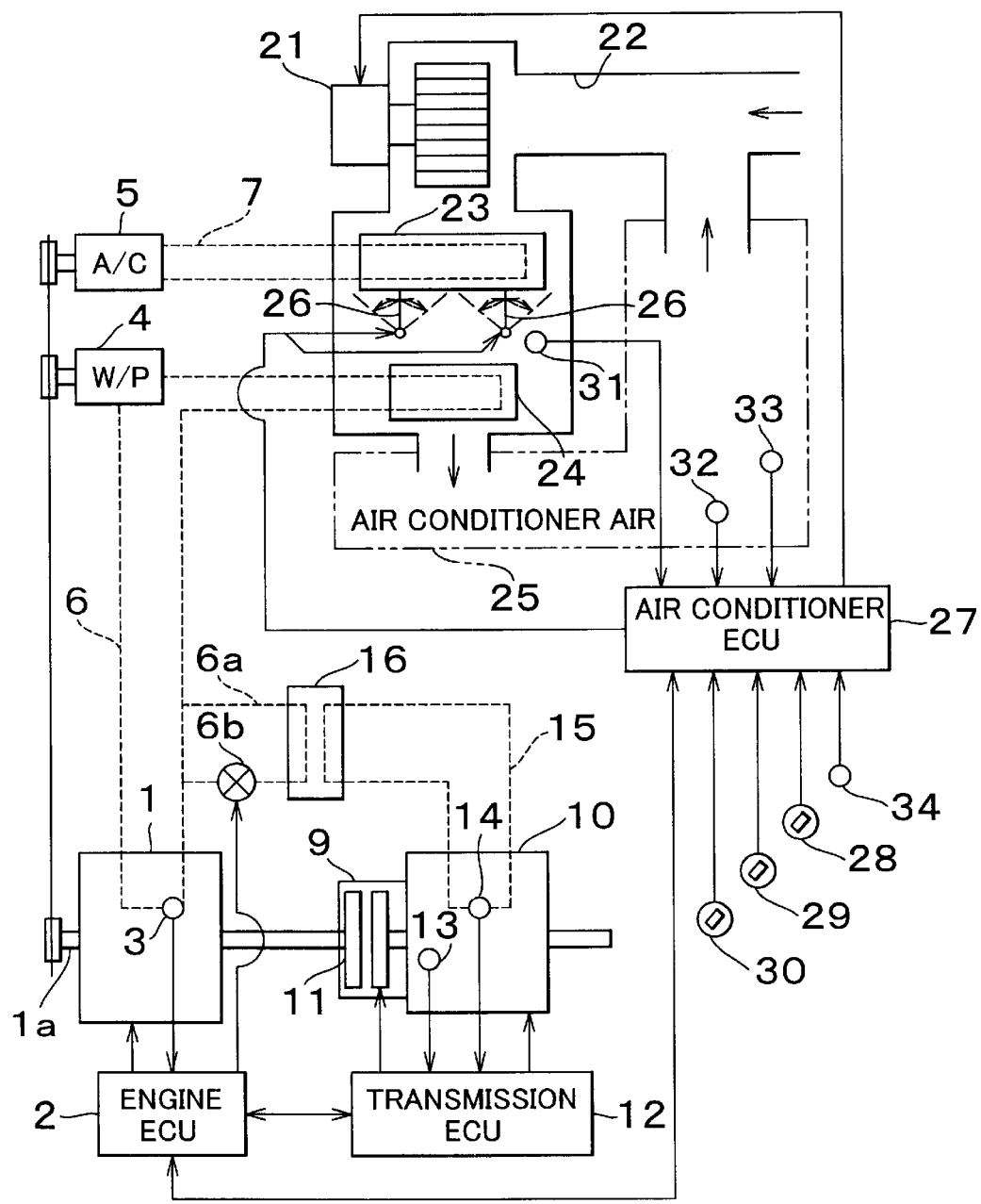
FIG. 2 is a schematic diagram illustrating an overall construction of a motor vehicle to which lockup clutch-equipped transmission control apparatuses in accordance with the first to fourth embodiments are applied.

An engine 1 shown in FIG. 1 is operated and controlled via an engine-controlling electronic control unit (engine ECU) 2 installed in the motor vehicle. The engine ECU 2 receives input of a detection signal from a water temperature sensor 3 that detects the temperature of cooling water of the engine 1. During operation of the engine 1, rotation of an output shaft 1a of the engine 1 can be transferred to a water pump 4 and an air conditioner compressor 5, so that the water pump 4 and the compressor 5 can be operated. When the water pump 4 operates, cooling water of the engine 1 circulates through a cooling water passage 6. When the compressor 5 operates, an air conditioner coolant is cooled while circulating through a coolant passage 7.

The output shaft 1a of the engine 1 is connected to a transmission 10 via a torque converter 9 that transfers drive power via fluid (working oil). Rotation of the output shaft 1a of the engine 1 is transferred to wheels of the motor vehicle via the torque converter 9 and the transmission 10, so that the vehicle runs. The aforementioned transmission 10 may be, for example, a continuously variable transmission capable of continuously varying the speed ratio, an automatic transmission that varies the speed ratio stepwise, etc.

The torque converter 9 is provided with a lockup clutch 11 that connects and disconnects the engine 1 and the transmission 10. The lockup clutch 11 assumes a "direct-coupled state" in which the lockup clutch 11 firmly connects the output shaft 1a of the engine 1 and an input shaft of the transmission 10, or a "disengaged state" in which the direct-coupled state is cancelled. The lockup clutch 11 is also able to assume an intermediate state between the direct-coupled state and the disengaged state, that is, a "slip state" in which the lockup clutch 11 partially connects the output shaft 1a and the input shaft of the transmission 10 while allowing relative rotation therebetween to a certain extent.

Both the torque converter 9 and the transmission 10 are operated by hydraulic pressure. The operation and control of the torque converter 9 and the transmission 10 is performed via a transmission ECU 12 installed in the motor vehicle. The transmission ECU 12 receives input of detection signals from various sensors, such as a turbine rotation speed sensor 13 that detects the speed of rotation input to the transmission 10 from the engine 1 (output shaft 1a), an oil temperature sensor 14 that detects the temperature of a working oil for operating the torque converter 9 and the transmission 10, etc. The transmission ECU 12 and the engine ECU 2 are interconnected, and communication between the transmission ECU 12 and the engine ECU 2 is possible therebetween.

The working oil for operating the torque converter 9 and the transmission 10 is warmed through the use of heat from the engine 1. That is, an oil passage 15 for circulating the working oil and the cooling water passage 6 extend through the interior of a heat exchanger (or warmer) 16 disposed in the motor vehicle. The heat exchanger 16 conducts heat exchange between the cooling water and the working oil. Therefore, when the working oil is cold, the cooling water warmed by heat from the engine 1 warms the working oil, and therefore loses heat. In this manner, the working oil can be warmed by the heat exchanger 16. Hence, the heat exchanger 16 reduces the incidence of a case where it becomes difficult to appropriately operate the torque converter 9 or the transmission 10 because the working oil is cold.

This design also reduces the increase of loss of power of the engine 1 involved in driving the torque converter 9, transmission 10, etc. while the working oil is cold.

A construction is also conceivable in which a flow adjusting valve 6b is provided for adjusting the amount of flow of engine cooling water that passes through the heat exchanger 16. This construction will be described with reference to FIG. 2. In this construction, an oil passage 15 for circulating the working fluid, and a branch passage 6a that branches from a cooling water passage 6 as described above extend through the interior of a heat exchanger 16. Thus, the heat exchanger 16 conducts heat exchange between the cooling water and the working oil. The engine cooling water, after being subjected to heat exchange, flows through the branch passage 6a, and then returns to the cooling water passage 6.

The branch passage 6a is provided with a flow control valve 6b that is opened and closed so as to adjust the amount of flow of engine cooling water that passes through the heat exchanger 16. The driving of the flow control valve 6b is controlled by the engine ECU 2. As the opening of the flow control valve 6b is decreased through control by the engine ECU 2, the amount of flow of engine cooling water that passes through the heat exchanger 16 decreases. If the working oil temperature is low, the amount of heat transferred from the engine cooling water to the working oil becomes small.

Next described will be an air conditioner apparatus that adjusts the temperature of a cabin of the motor vehicle by heating or cooling.

In this air conditioner apparatus, air is introduced into an air duct 22 by operating a blower 21. After the air is cooled or heated by an evaporator 23 or a heater core 24, the air is supplied into a cabin 25.

The evaporator 23, with the coolant passage 7 extending through the interior thereof, cools air flowing in the air duct 22 via a coolant flowing in the coolant passage 7. The heater core 24, with the cooling water passage 6 extending through the interior thereof, heats air in the air duct 22 via the cooling water warmed in the cooling water passage 6.

In the air duct 22, an air-mixing damper 26 is provided between the evaporator 23 and the heater core 24. The air-mixing damper 26 is used to adjust the temperature of air that passes through the air duct 22. The air-mixing damper 26 is opened and closed so as to adjust the proportion of the amount of air that passes through the heater core 24 to the total amount of air that passes through the evaporator 23.

That is, for example, if the air-mixing damper 26 is operated to such a position that air does not passes through the heater core 24 (the position corresponding to a minimum opening of the air-mixing damper 26), the air cooled by the evaporator 23 while passing therethrough is directly supplied into the cabin 25. As the air-mixing damper 26 is displaced toward a side (maximum opening side) where the amount of air that passes through the heater core 24 is great, the temperature of air supplied from the air duct 22 into the cabin 25 becomes higher. Therefore, as the degree of opening of the air-mixing damper 26 increases and therefore the amount of air that passes through the heater core 24 increases, the amount of heat that the cooling water loses to the air increases.

The blower 21 and the air-mixing damper 26 of the air conditioner apparatus are operated and driven via an air conditioner ECU 27 installed in the motor vehicle. The air conditioner ECU 27 and the engine ECU 2 are interconnected, and communication is possible therebetween. The air conditioner ECU 27 accepts input of signals from an auto-control select switch 28, a temperature setting switch 29, and an air volume setting switch 30 that are operated by an occupant in the cabin of the motor vehicle. The air conditioner ECU 27 also accepts input of detection signals from various sensors as follows.

a potentiometer 31 that outputs a signal corresponding to the open-close position of the air-mixing damper 26
   an internal air temperature sensor 32 that detects the temperature of air in the cabin 25 (internal air temperature)
   a solar radiation sensor 33 that detects the amount of solar radiation in the cabin 25
   an external air temperature sensor 34 that detects the temperature of air outside the cabin 25 (external air temperature)

If the operation position of the auto-control select switch 28 is "AUTO", the air conditioner ECU 27 executes an automatic control of automatically controlling the blower 21 and the air-mixing damper 26 in accordance with the temperature set by the temperature setting switch 29, and in accordance with the internal air temperature, the amount of solar radiation, the external air temperature, etc.

Firstly in this automatic control, a needed outlet temperature TAO is computed in accordance with the set temperature, the internal air temperature, the amount of solar radiation, the external air temperature, etc. The needed outlet temperature TAO is the temperature of air blown out from the air duct 22 into the cabin 25 that is needed in order to keep the temperature in the cabin 25 at the set temperature. The air conditioner ECU 27 adjusts the degree of opening of the air-mixing damper 26 so that the temperature of air blown out from the air duct 22 into the cabin 25 reaches the needed outlet temperature TAO, and controls the driving of the blower 21 in accordance with the needed outlet temperature TAO so as to automatically adjust the blower air volume to an optimal level.

If the operation position of the auto-control select switch 28 is "MANUAL", the air conditioner ECU 27 controls the blower 21 and the air-mixing damper 26 in accordance with the operation positions of the switches and the like operated by an occupant of the motor vehicle. That is, the air conditioner ECU 27 controls the driving of the blower 21 so as to provide the blower air volume set by the air volume setting switch 30, and controls the driving of the air-mixing damper 26 in accordance with the set temperature set by the temperature setting switch 29.

Next described will be manners of engagement of the lockup clutch 11. The lockup clutch 11 is engaged when the state of operation of the motor vehicle is in the lockup region. The lockup region is set based on the speed of the motor vehicle (vehicle speed), and the temperature of working oil (oil temperature) of the torque converter 9 and the like. The vehicle speed used herein is determined based on the detection signal from the turbine rotation speed sensor 13, and the present speed ratio of the transmission 10.

Engagement of the lockup clutch 11 reduces the deterioration of the power transfer efficiency involved in the power transfer from the engine 1 side to the wheel side via fluid. Thus, the engagement of the lockup clutch 11 is advantageous in improving the fuel economy of the engine 1. However, if the temperature of the working oil (oil temperature) for operating the lockup clutch 11 (torque converter 9) is low, response delay occurs in the driving of the lockup clutch 11, and therefore causes a shock at the time of engagement of the lockup clutch 11. Particularly if such a shock occurs during a low-vehicle speed run, drivability is affected to an unignorable extent.

Therefore, in view of achieving both reduction of the deterioration of drivability and improvement of fuel economy of the engine 1, it is preferable that the lockup region be expanded to a low-vehicle speed side as much as possible provided that the drivability is not significantly affected.

The lockup region set as described above is indicated as regions A, B in FIG. 3. If the vehicle speed and the oil temperature are within the region A, B, the lockup clutch 11 is engaged. By engaging the lockup clutch 11 in this manner, the number of occasions of engagement of the lockup clutch 11 is increased as much as possible, so that maximum improvement of fuel economy can be achieved while adverse effect on drivability is reduced.

However, besides improved fuel economy of the engine 1, an increased number of occasions of engagement of the lockup clutch 11 has an undesired aspect. That is, since the power transfer efficiency between the engine 1 and the wheels is also improved, the amount of heat produced by the engine 1 at the time of operating the engine 1 to provide a predetermined drive power of the motor vehicle decreases, and therefore, the amount of heat transferred from the engine 1 to the cooling water also decreases.

If the lockup clutch 11 is engaged and the engine 1 is decelerating, it is possible to secure a predetermined engine rotation speed even if fuel-cut is performed. Therefore, in that case, engine fuel-cut is performed via the engine ECU 2 so as to improve fuel economy. If such fuel-cut is carried out, fuel combustion in the engine 1 discontinues, so that the amount of heat generated by the engine 1 decreases.

Therefore, as the number of occasions of engagement of the lockup clutch 11 increases, the amount of heat generated by the engine decreases as described above, and it becomes less easy to raise the temperature of cooling water for warming air-conditioning air supplied into the cabin 25. As a result, the heating capability of the air conditioner apparatus decreases. Thus, there is a possibility of insufficient heating capability of the air conditioner apparatus when high heating capability is requested, for example, at the time of engine warm-up in wintertime, or the like.

Therefore, in this embodiment, if the requested heating capability of the air conditioner apparatus is higher than or equal to a predetermined level, the lockup region is reduced from the region A, B to the region A toward a high-vehicle speed side, so that engagement of the lockup clutch 11 is restricted. By restricting the engagement of the lockup clutch 11 in this manner, the aforementioned reduction in the amount of heat produced by the engine can be reduced, and the deterioration in the heating capability of the air conditioner apparatus can be reduced.

Figure 4:
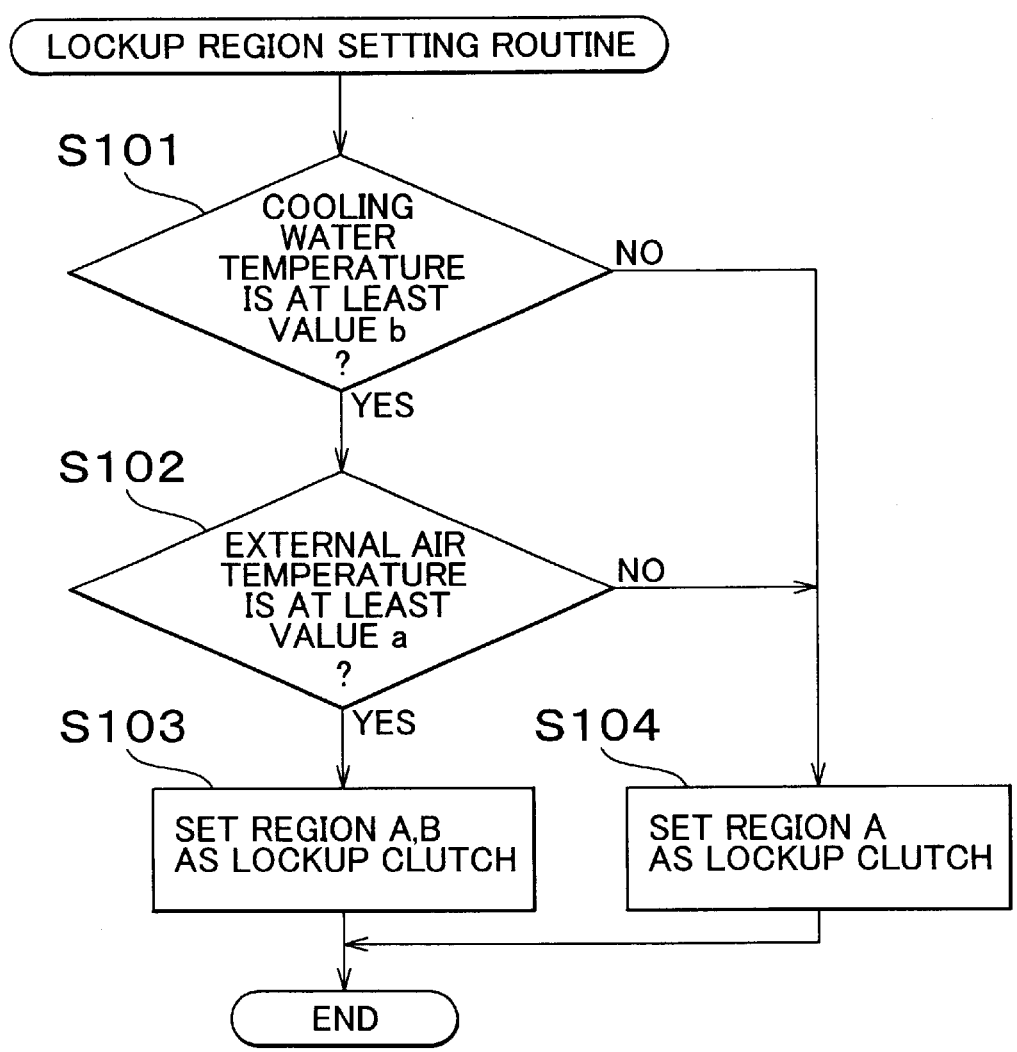
FIG. 4 is a flowchart illustrating a procedure of setting a lockup region in accordance with the first embodiment.

Next, a procedure of setting a lockup region will be described with reference to the flowchart of FIG. 4 that illustrates a lockup region setting routine. The lockup region setting routine is executed, for example, by a time interrupt at every predetermined time, via the transmission ECU 12.

Normally, if the engine temperature is low, an increasing correction of the amount of fuel injection is performed in the engine 1 so as to stabilize the engine operation. Therefore, when the lockup clutch is engaged while the engine temperature is low, the increasing correction of the amount of fuel injection is performed, and fuel-cut is executed and the execution is discontinued in accordance with the start and end of engine deceleration. In this case, the changes of the output torque of the engine 1 during execution of the fuel-cut and during discontinuation of the fuel-cut increase corresponding to the increasing correction of the amount of fuel injection. Therefore, great shock occurs on the vehicle, and drivability is adversely affected.

In the process of step S101 in the lockup region setting routine, it is determined whether the engine temperature has increased to such a level that the aforementioned increasing correction of the amount of fuel injection is not performed, based on whether the cooling water temperature is higher than or equal to a predetermined value b (e.g., 40° C.). The predetermined value used herein may be an upper limit value of the cooling water temperature where the aforementioned increasing correction of the amount of fuel injection is performed. If the determination at step S101 is negatively made, there is a possibility of inconvenience as mentioned above, so that the region A is set as a lockup region in FIG. 3 (S104).

The setting of a lockup region in this manner reduces the lockup region toward the high-vehicle speed side, and the lockup clutch 11 is thus restricted, in comparison with the case where the region A, B is set as a lockup region. In this case, a situation where the engine decelerates while the lockup clutch 11 is engaged becomes unlikely. Therefore, the number of occasions of execution of the fuel-cut and discontinuation of the execution with the amount of fuel injection that has been corrected in the increasing direction decreases, and occurrence of the aforementioned inconvenience is restricted.

Conversely, if the determination at the step S101 is affirmatively made, it is then determined whether the external air temperature, that is, a parameter related to the temperature in the cabin 25, is higher than or equal to a predetermined value a (e.g., 5° C.) (S102). In this embodiment, a heating capability requested of the air conditioner apparatus is estimated based on the external air temperature, and it is determined whether the requested heating capability is higher than or equal to a predetermined level. This manner of determination is possible because low external air temperature means that high heating capability is requested of the air conditioner apparatus.

Figure 3:
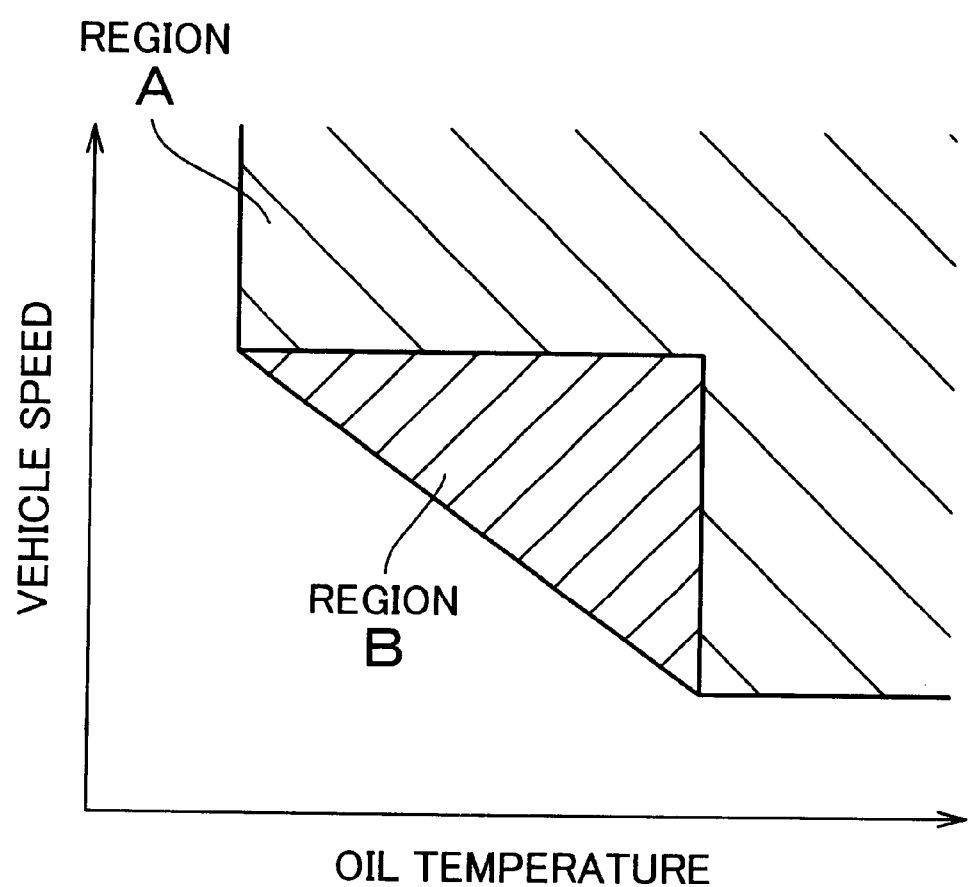
FIG. 3 is a diagram for illustrating the lockup region.

If affirmative determination is made in step S102, it is considered that the heating capability requested of the air conditioner apparatus is less than the predetermined level. In this case, the region A, B in FIG. 3 is set as a lockup region (S103), so that the lockup clutch 11 will be engaged on an increased number of occasions. Therefore, the fuel economy of the engine 1 is improved to a maximum extent.

If negative determination is made in step S102, it is considered that the heating capability requested of the air conditioner apparatus is higher than or equal to the predetermined level. In this case, the processing of step S104 is executed, in which the lockup region is reduced from the region A, B to the region A located toward the high-vehicle speed side, so that engagement of the lockup clutch 11 is restricted. Therefore, the reduction in the amount of engine-produced heat caused by engagement of the lockup clutch 11 is lessened. Hence, this processing reduces the deterioration of the heating capability of the air conditioner apparatus, which heats the cabin 25 using heat from the engine.

The foregoing embodiment achieves the following advantages.

(1) Normally, the region A, B in FIG. 3 is set as a lockup region, so that the lockup clutch 11 will be engaged on as many occasions as possible. Therefore, the fuel economy of the engine 1 is improved to a maximum extent. If the heating capability requested of the air conditioner apparatus is higher than or equal to the predetermined level, the lockup region is set to the region A and is thus reduced toward the high-vehicle speed side. In this case, the lockup clutch 11 is not engaged until the vehicle speed reaches a high-speed range. Therefore, the number of occasions of engagement of the lockup clutch 11 is reduced, that is, the engagement of the lockup clutch 11 is restricted. Therefore, the above-described changing of the lockup region makes it possible to reduce the deterioration of the heating capability of the air conditioner apparatus while improving the fuel economy of the engine 1.

(2) It is determined that the heating capability requested of the air conditioner apparatus is higher than or equal to the predetermined level, based on the condition that the external air temperature, which is a parameter related to the temperature inside the cabin 25, is lower than the predetermined value a. That is, a requested heating capability is estimated based on the external air temperature, and it is determined whether the requested heating capability is higher than or equal to the predetermined level. On the basis of this determination, the lockup region is reduced toward the high-vehicle speed side, so that the engagement of the lockup clutch 11 is restricted. Therefore, restriction on the engagement of the lockup clutch 11 can be appropriately made.

(3) During engagement of the lockup clutch, the fuel-cut of the engine 1 is executed and discontinued in accordance with the start and end of deceleration of the engine. If the fuel-cut is performed during a low temperature state of the engine 1 where the amount of fuel injection is corrected in the increasing direction, the changes of the output torque of the engine 1 during execution of the fuel-cut and during discontinuation of the fuel-cut increase by an amount corresponding to the increasing correction, so that a great shock occurs on the motor vehicle. Thus, the fuel-cut during a low temperature state of the engine 1 is not favorable in terms of drivability. If the cooling water temperature is less than the predetermined value b and the engine temperature is low, the lockup region is reduced from the region A, B to the region A in FIG. 3, so that the engagement of the lockup clutch 11 is restricted. Therefore, the execution of fuel-cut and the discontinuation thereof during the increasing correction of the amount of fuel injection can be reduced, so that the disadvantage in drivability can be reduced.

(4) In the motor vehicle equipped with the heat exchanger 16, if the working oil of the torque converter 9 and the transmission 10 is cold, the working oil is warmed by the cooling water in the heat exchanger 16. In this case, since heat from the engine 1 (heat from the cooling water) is transferred to the working oil, the aforementioned problem of insufficient heating capability of the air conditioner apparatus becomes remarkable when high heating capability is requested of the air conditioner apparatus. However, by restricting the engagement of the lockup clutch 11 as described above if the requested heating capability of the air conditioner apparatus is higher than or equal to a predetermined level, the problem of insufficient heating capability of the air conditioner apparatus can be precisely controlled.

Second Embodiment

A second embodiment of the invention will next be described with reference to FIGS. 5 and 6.

In this embodiment, the determination as to whether the heating capability requested of the air conditioner apparatus is higher than or equal to a predetermined level is made based on the needed outlet temperature, which is a parameter related to the temperature inside the cabin 25, if the automatic control of the air conditioner apparatus is selected, and based on the degree of opening of the air-mixing damper 26 and the blower air volume, which are parameters related to the temperature inside the cabin 25, if the manual control of the air conditioner apparatus is selected.

Figure 5:
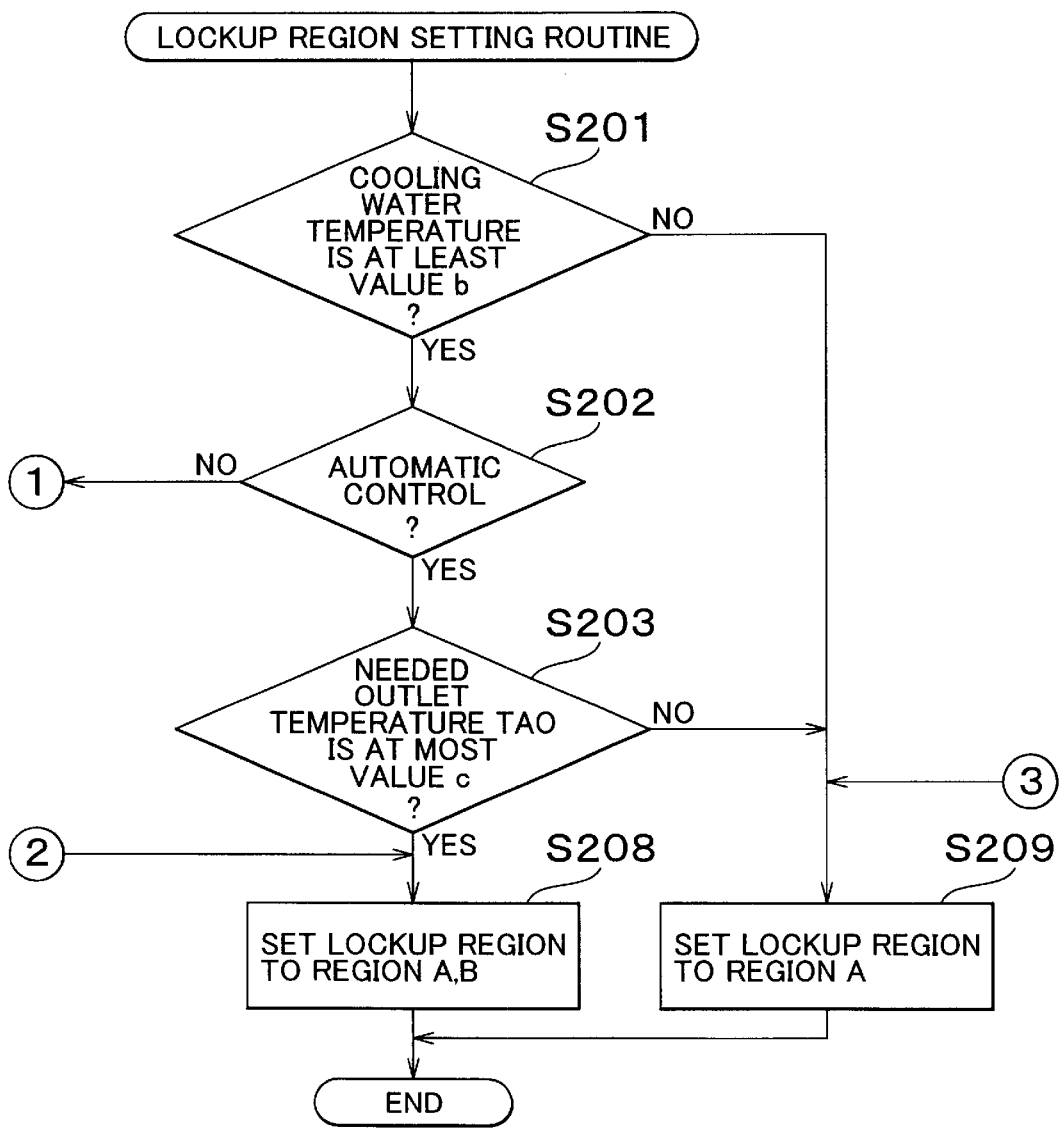
FIG. 5 is a flowchart illustrating a procedure of setting a lockup region in accordance with the second embodiment.
Figure 6:
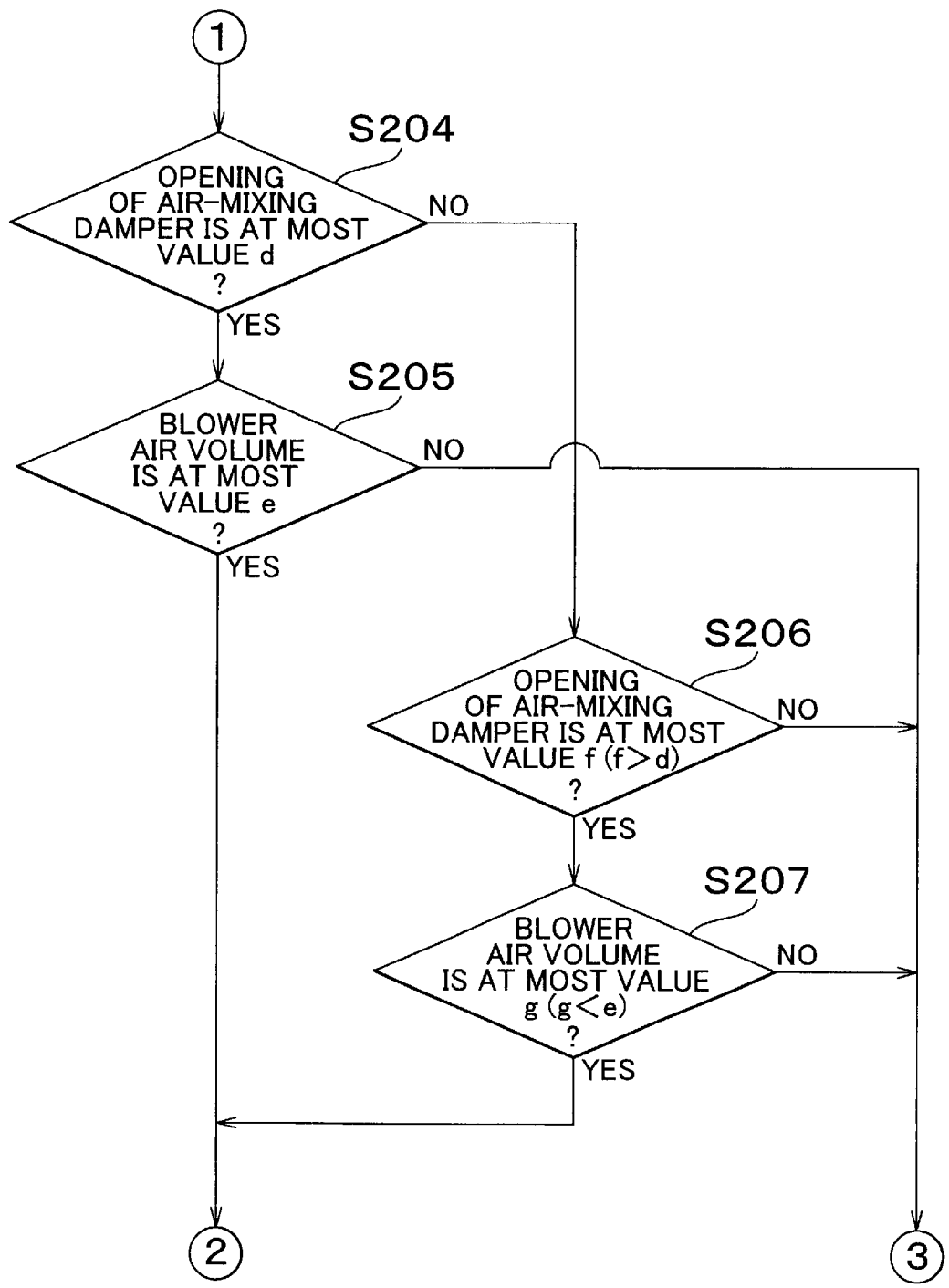
FIG. 6 is a flowchart illustrating the procedure of setting a lockup region in accordance with the second embodiment.

FIGS. 5 and 6 show a flowchart illustrating a lockup region setting routine in accordance with this embodiment. The lockup region setting routine of the second embodiment differs from that of the first embodiment in a process (S202 to S207) corresponding to step S102 in the lockup region setting routine of the first embodiment.

In the lockup region setting routine of this embodiment, if it is determined in step S201 (FIG. 5) that the cooling water temperature is higher than or equal to a predetermined value b, it is then determined whether the air conditioner apparatus is under the automatic control (S202). If affirmative determination is made in step S202, it is then determined whether the needed outlet temperature TAO, which is a parameter related to the temperature inside the cabin 25, is less than or equal to a predetermined value c (e.g., 50° C.) (S203). In this embodiment, a heating capability requested of the air conditioner apparatus is estimated based on the needed outlet temperature TAO, and it is determined whether the requested heating capability is higher than or equal to a predetermined level. This manner of determination is possible because increases in the needed outlet temperature TAO mean increases in the heating capability requested of the air conditioner apparatus.

If affirmative determination is made in step S203, it is considered that the heating capability requested of the air conditioner apparatus is lower than the predetermined level. In this case, the lockup region is set to the region A, B (FIG. 3) (S208). Conversely, if negative determination is made in step S203, it is considered that the heating capability requested of the air conditioner apparatus is higher than or equal to the predetermined level. In this case, the processing of step S209 is executed, whereby the lockup region is reduced from the region A, B to the region A located toward the high-vehicle speed side, so that the engagement of the lockup clutch 11 is restricted.

If in step S202, negative determination is made, that is, if it is determined that the manual control is being executed, it is then determined whether the degree of opening of the air-mixing damper 26 is less than or equal to a predetermined value d (e.g., 70%) (S204 in FIG. 6), and it may be determined whether the blower air volume is less than or equal to a predetermined value e (S205). In this process, the heating capability requested of the air conditioner apparatus is estimated based on the degree of opening of the air-mixing damper 26 and the blower air volume, and it is determined whether the requested heating capability is higher than or equal to the predetermined level.

The degree of opening of the air-mixing damper 26 is determined based on the detection signal from the potentiometer 31. As the degree of opening of the air-mixing damper 26 approaches 100% (maximum degree of opening), the amount of air that passes through the heater core 24 within the air duct 22 increases. Therefore, greater degrees of opening of the air-mixing damper 26 mean that greater heating capabilities are requested of the air conditioner apparatus. The blower air volume is determined based on a signal from the air volume setting switch 30. While the air conditioner is heating the cabin 25, greater blower air volumes mean that greater heating capabilities are requested of the air conditioner apparatus.

If affirmative determination is made in steps S204 and S205, that is, if it is determined that the heating capability requested of the air conditioner apparatus is lower than a predetermined level, the above-described processing of step S208 (FIG. 5) is executed. If negative determination is made in step S205 although affirmative determination is made in step S204, it is considered that the heating capability requested of the air conditioner apparatus is higher than or equal to the predetermined level. Then, the processing of step S209 (FIG. 5) is executed.

If negative determination is made in step S204, it is then determined whether the degree of opening of the air-mixing damper 26 is less than or equal to a predetermined value f (e.g., 80%) that is greater than the predetermined value c (S206). It is also determined whether the blower air volume is less than or equal to a predetermined value g (g<e) (S207). In this process, too, a heating capability requested of the air conditioner apparatus is estimated based on the degree of opening of the air-mixing damper 26 and the blower air volume, and it is determined whether the requested heating capability is higher than or equal to a predetermined level.

That is, if negative determination is made in either step S206 or step S207, it is determined that the heating capability requested of the air conditioner apparatus is higher than or equal to the predetermined level. Then, the processing of step S209 (FIG. 5) is executed. If affirmative determination is made in both step S206 and step S207, it is determined that the heating capability requested of the air conditioner apparatus is lower than the predetermined level. Then, the processing of step S208 (FIG. 5) is executed.

This embodiment achieves substantially the same advantages as the first embodiment.

The foregoing embodiments may be modified, for example, as follows.

- If the engine temperature is so low that the increasing correction of the amount of fuel injection is performed, that is, if the cooling water temperature is less than or equal to the predetermined value b, it is not altogether necessary to reduce the lockup region.
- Although the external air temperature, the needed outlet temperature TAO, the degree of opening of the air-mixing damper 26, the blower air volume, etc. are adopted as parameters related to the temperature inside the cabin 25 used to estimate the heating capability requested of the air conditioner apparatus, it is also possible to adopt other parameters, such as the internal air temperature, the amount of solar radiation, etc.
- Although in the foregoing embodiments, the engagement of the lockup clutch 11 is restricted by reducing the lockup region from the region A, B to the region A if the heating capability requested of the air conditioner apparatus is higher than or equal to the predetermined level, the invention is not limited so. For example, restriction of the engagement of the lockup clutch 11 may also be accomplished by prohibiting the engagement of the lockup clutch 11 if the heating capability requested of the air conditioner apparatus is higher than or equal to a predetermined level.

Third Embodiment

Figure 7:
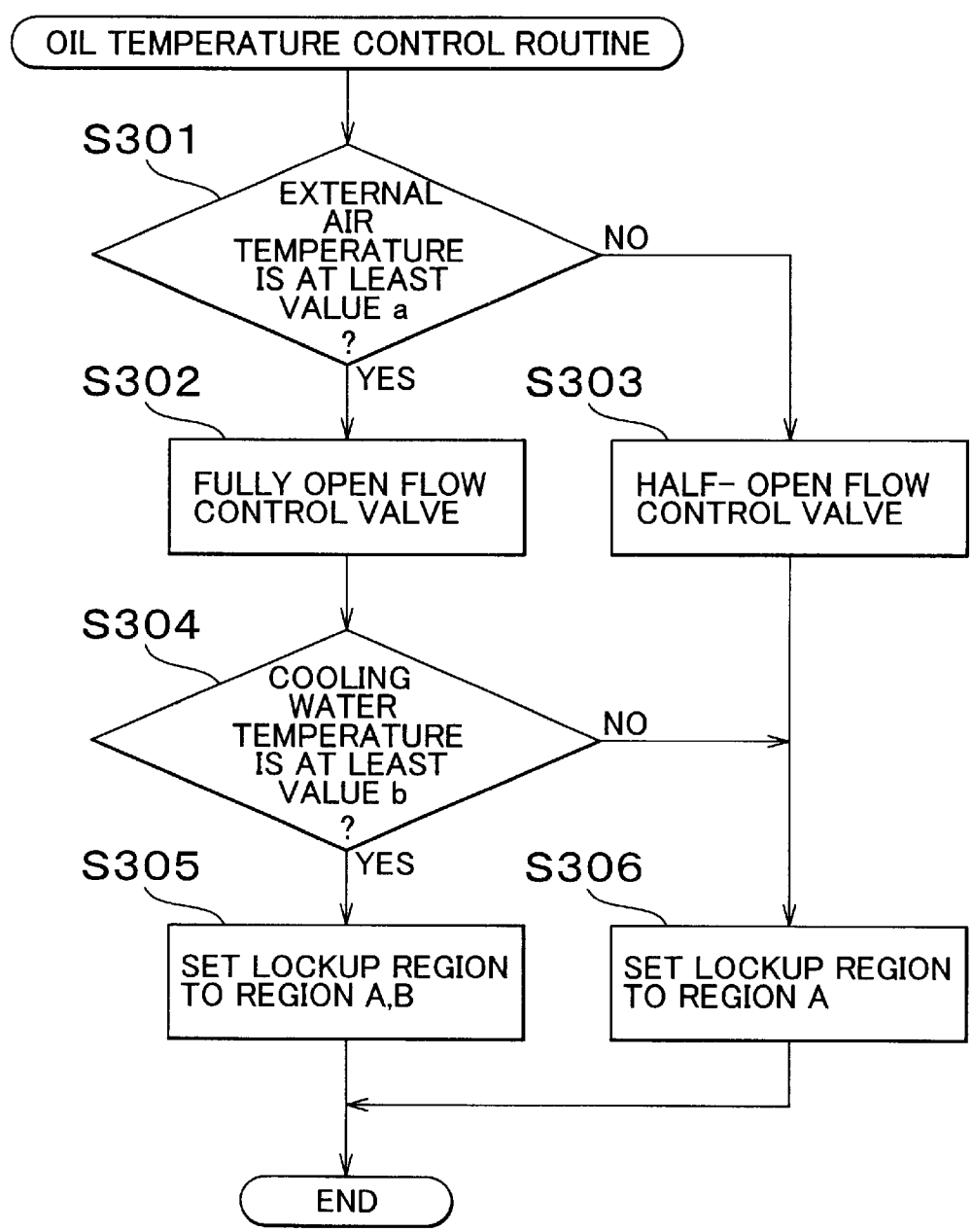
FIG. 7 is a flowchart illustrating a procedure of controlling the temperature of working oil in accordance with the third embodiment.

A procedure of controlling the temperature of working oil of the torque converter 9, the transmission 10, etc. will be described with reference to the flowchart of FIG. 7 illustrating an oil temperature control routine. This oil temperature control routine is executed, for example, by a time interrupt at every predetermined time, via the engine ECU 2.

In the oil temperature control routine, it is first determined whether the external air temperature, which is a parameter related to the temperature inside the cabin 25, is higher than or equal to a predetermined value a (e.g., 5° C.) (S301). In this routine, a heating capability requested of the air conditioner apparatus is estimated based on the external air temperature, and it is determined whether the requested heating capability is higher than or equal to a predetermined level. This manner of determination is possible because low external air temperatures means that increased high heating capabilities are requested of the air conditioner apparatus.

If affirmative determination is made in step S301, it is considered that the heating capability requested of the air conditioner apparatus is lower than the predetermined level. In this case, the flow control valve 6b is fully open (S302) to maximize the amount of flow of engine cooling water into the heat exchanger 16. Therefore, the heat exchange between the engine cooling water and the working oil occurs at a maximum efficiency. Therefore, when the working oil is cold, the working oil is quickly warmed by the engine cooling water. This operation reduces the incidence of an event where a cold state of the working oil makes it difficult to properly operate the torque converter 9 or the transmission 10, and an event where the power loss of the engine 1 increases.

However, if the heat exchange is conducted at a maximum efficiency, the increase in loss of power of the engine 1 can be reduced, and fuel economy thereof can be improved. However, since the amount of heat transferred from the engine cooling water to the working oil also becomes maximum, the engine cooling water temperature less readily rises. As a result, the heating capability of the air conditioner apparatus drops. Thus, there is a possibility of insufficient heating capability of the air conditioner apparatus when high heating capability is requested, for example, at the time of engine warm-up in wintertime, and the like.

Considering the aforementioned circumstances, in the third embodiment, if it is determined that the heating capability requested of the air conditioner apparatus is higher than or equal to a predetermined level based on the negative determination in step S301, the flow control valve 6b is set to a half-open state so as to reduce the amount of flow of engine cooling water that passes through the heat exchanger 16 (S303). Therefore, the amount of heat transferred from the engine cooling water to the working oil in the heat exchanger 16 decreases, so that it becomes possible to secure the needed heating capability of the air conditioner apparatus.

The temperature of engine cooling water is affected by the incidence of engagement of the lockup clutch 11 as described below. Depending on whether the lockup clutch 11 is engaged, the power transfer efficiency in power transfer from the engine 1 to the transmission 10 changes, and the amount of heat produced by the engine 1 at the time of an engine operation to provide a predetermined drive power of the motor vehicle changes, and the amount of heat transferred from the engine 1 to the engine cooling water changes.

That is, when the lockup clutch 11 is engaged, the deterioration of power transfer efficiency involved in the power transfer from the engine 1 to the transmission 10 via fluid is reduced, so that the amount of engine-produced heat decreases, and the temperature of engine cooling water tends to drop. Conversely, when the lockup clutch 11 is not engaged, the power transfer efficiency deteriorates in association with the power transfer from the engine 1 to the lockup clutch 11 via fluid, so that the amount of engine-produced heat increases and the temperature of engine cooling water tends to rise.

Furthermore, if the engine 1 is decelerated during the engaged state of the lockup clutch 11, it is possible to secure a predetermined engine rotation speed if fuel-cut is performed. Therefore, engine fuel-cut is performed via the engine ECU 2 in order to improve fuel economy. If fuel-cut is performed, discontinuation of fuel combustion in the engine 1 reduces the amount of engine-produced heat, so that temperature rise of the engine cooling water becomes unlikely.

For the aforementioned reasons, the temperature of engine cooling water becomes less likely to rise, as the incidence of engagement of the lockup clutch 11 increases.

To improve the fuel economy of the engine 1, it is advantageous to expand the occasion of engagement of the lockup clutch 11. Therefore, if the heating capability requested of the air conditioner apparatus is lower than a predetermined level(YES in S301), the lockup region is set so as to expand the region as much as possible (S305) on condition that the cooling water temperature is higher than or equal to a predetermined value b (e.g., 40° C.) (YES in S304). The thus-set lockup region may be the same as the region A, B in FIG. 3 described above in conjunction with the first embodiment.

The processing of step S306 is also executed if the heating capability requested of the air conditioner apparatus is higher than or equal to the predetermined level (NO in step S301). In this case, the incidence of engagement of the lockup clutch 11 is reduced, so that the drop in the amount of engine-produced heat involved in the engagement of the lockup clutch 11 is reduced. That, the processing of step S303 facilitates temperature raise of the engine cooling water, and the processing of step S306 also facilitates temperature raise of the engine cooling water. Therefore, a needed heating capability of the air conditioner apparatus can be more precisely secured.

The above-described third embodiment achieves the following advantages.

(1) When the working oil of the torque converter 9 or the transmission 10 is cold, the power loss of the engine 1 increases in association with the driving of the torque converter 9 and the transmission 10, and therefore, fuel economy deteriorates. If the working oil in a cold state is heated through heat exchange between the engine cooling water and the working oil in the heat exchanger 16, the engine cooling water loses heat to the working oil, which is disadvantageous in securing a needed heating capability of the air conditioner apparatus. However, by controlling the amount of engine cooling water that passes through the heat exchanger 16 in accordance with the requested heating capability of the air conditioner apparatus, it becomes possible to secure the needed heating capability while improving the fuel economy of the engine 1. That is, if it is determined that the heating capability requested of the air conditioner apparatus is higher than or equal to a predetermined level, the amount of flow of engine cooling water that passes through the heat exchanger 16 can be reduced. Therefore, it becomes possible to achieve both an improvement in the fuel economy of the engine 1 and reliable provision of a heating capability of the air conditioner apparatus.

(2) It is determined that the heating capability requested of the air conditioner apparatus is higher than or equal to a predetermined level, based on the condition that the external air temperature, which is a parameter related to the temperature inside the cabin 25, is lower than a predetermined value a. That is, a requested heating capability is estimated based on the external air temperature, and it is determined whether the requested heating capability is higher than or equal to the predetermined level. On the basis of this determination, the amount of flow of engine cooling water that passes through the heat exchanger 16 is controlled. Therefore, the control of the amount of flow can be performed appropriately in view of achieving both an improvement in the fuel economy and reliable provision of a heating capability.

While the lockup clutch 11 is engaged, the deterioration of power transfer efficiency involved in the power transfer from the engine 1 to the transmission 10 via fluid is reduced, so that the fuel economy of the engine 1 improves. However, in this case, the amount of engine-produced heat reduces, and temperature rise of the engine cooling water is retarded, which is disadvantageous in securing a needed heating capability of the air conditioner apparatus. Considering this, this embodiment restricts the engagement of the lockup clutch 11 by reducing the lockup region from the region A, B to the region A. Therefore, the reduction in the amount of engine-produced heat is lessened, so that the heating capability of the air conditioner apparatus can be more precisely secured.

Fourth Embodiment

A fourth embodiment of the invention will next be described with reference to FIGS. 8 and 9. The fourth embodiment determines whether the heating capability requested of the air conditioner apparatus is higher than or equal to a predetermined level based on the needed outlet temperature TAO, which is a parameter related to the temperature inside the cabin 25, during the automatic control of the air conditioner apparatus, and based on the degree of opening of the air-mixing damper 26 and the blower air volume, which are parameters related to the temperature inside the cabin 25, during the manual control of the air conditioner apparatus.

Figure 8:
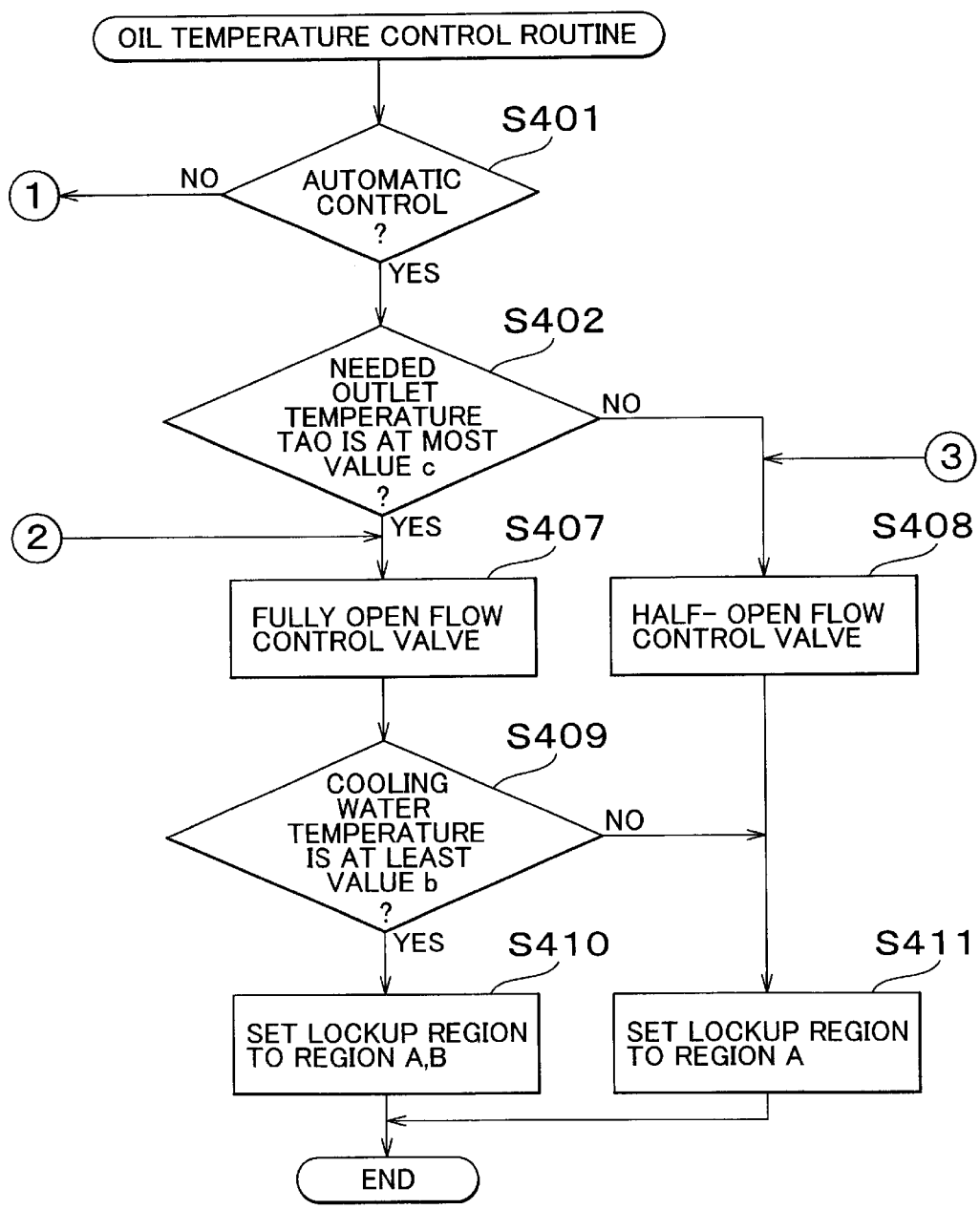
FIG. 8 is a flowchart illustrating a procedure of controlling the temperature of working oil in accordance with the fourth embodiment.
Figure 9:
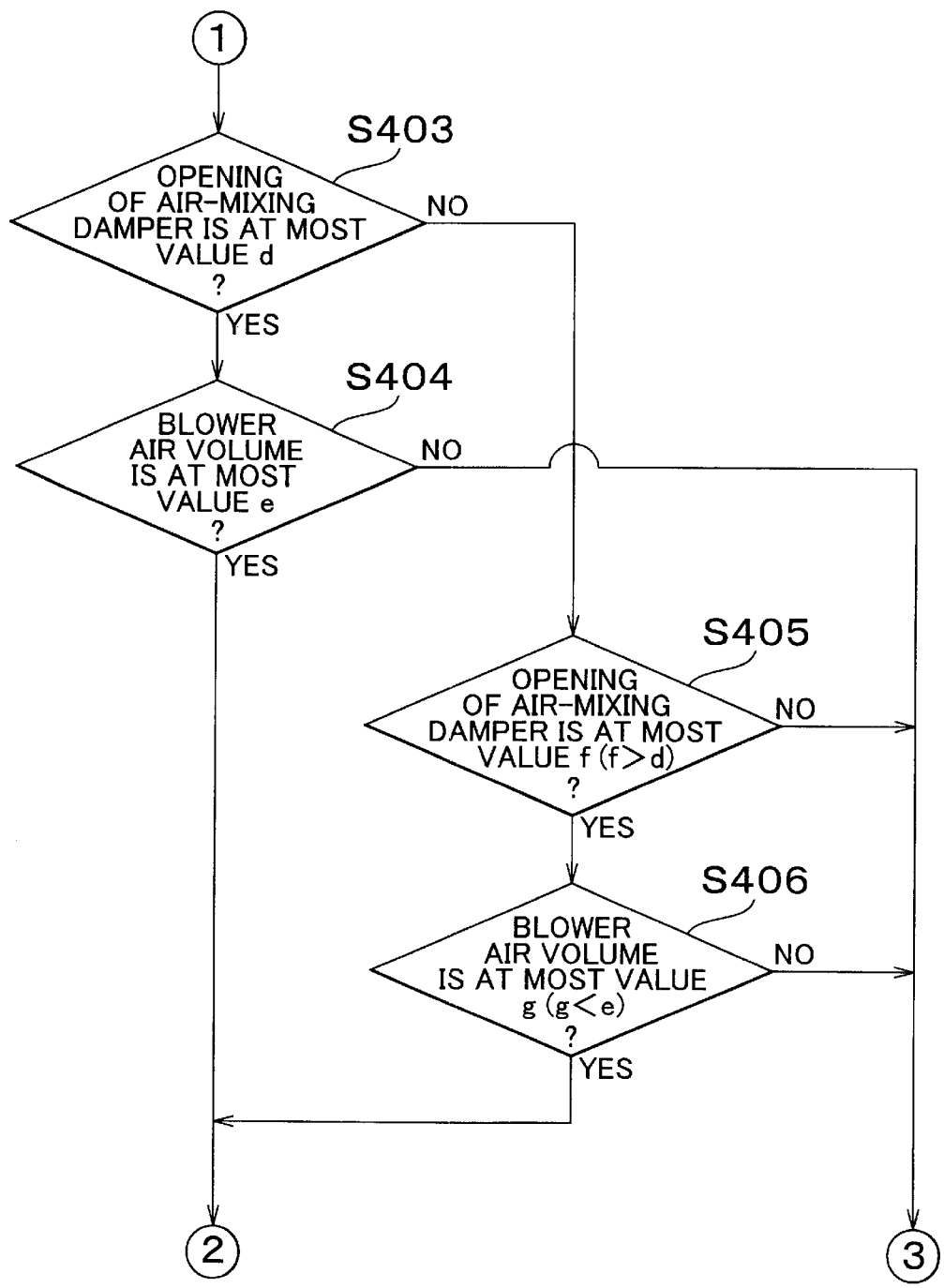
FIG. 9 is a flowchart illustrating the procedure of controlling the temperature of working oil in accordance with the fourth embodiment.

FIGS. 8 and 9 show a flowchart illustrating an oil temperature control routine in accordance with this embodiment. The oil temperature control routine of this embodiment differs from that of third embodiment in a process (S401 to S406) corresponding to step S301 in the oil temperature control routine of the third embodiment.

In the oil temperature control routine in the fourth embodiment, it is first determined in step S401 (FIG. 8) whether the automatic control is being executed. If affirmative determination is made in step S401, it is then determined whether the needed outlet temperature TAO, which is a parameter related to the temperature inside the cabin 25, is lower than or equal to a predetermined value c (e.g., 50°C.) (S402). In this routine, a heating capability requested of the air conditioner apparatus is estimated based on the needed outlet temperature TAO, and it is determined whether the requested heating capability is higher than or equal to a predetermined level. This manner of determination is possible because increases in the needed outlet temperature TAO mean increases in the heating capability requested of the air conditioner apparatus.

If affirmative determination is made in step S402, it is considered that the heating capability requested of the air conditioner apparatus is lower than a predetermined level. Then, the flow control valve 6b is fully opened (S407). Conversely, if negative determination is made in step S402, it is considered that the heating capability requested of the air conditioner apparatus is higher than or equal to the predetermined level. Then, the flow control valve 6b is half-opened, and the lockup region is set to the region A (FIG. 3) (S408, S411).

Conversely, if negative determination is made in step S401, it is considered that the manual control is being executed. It is then determined whether the degree of opening of the air-mixing damper 26 is less than or equal to a predetermined value d (e.g., 70%) (S403 in FIG. 9), and it is determined whether the blower air volume is less than or equal to a predetermined value e (S404). In this routine, a heating capability requested of the air conditioner apparatus is estimated based on the degree of opening of the air-mixing damper 26 and the blower air volume, and it is determined whether the requested heating capability is higher than or equal to a predetermined level.

The degree of opening of the air-mixing damper 26 is determined based on the detection signal from the potentiometer 31. As the degree of opening of the air-mixing damper 26 approaches 100% (maximum degree of opening), the amount of air that passes through the heater core 24 within the air duct 22 increases, as mentioned above. Therefore, greater degrees of opening of the air-mixing damper 26 mean that greater heating capabilities are requested of the air conditioner apparatus. The blower air volume is determined based on a signal from the air volume setting switch 30. While the air conditioner is heating the cabin 25, greater blower air volumes mean that greater heating capabilities are requested of the air conditioner apparatus.

If affirmative determination is made in steps S403 and S404, that is, if it is considered that the heating capability requested of the air conditioner apparatus is lower than a predetermined level, the above-described processing of step S407 (FIG. 8) is executed. If negative determination is made in step S404 although affirmative determination is made in step S403, it is considered that the heating capability requested of the air conditioner apparatus is higher than or equal to the predetermined level. Then, the processing of steps S408, S411 (FIG. 8) is executed.

If negative determination is made in step S403, it is then determined whether the degree of opening of the air-mixing damper 26 is less than or equal to a predetermined value f (e.g., 80%) that is greater than the predetermined value c (S405). It is also determined whether the blower air volume is less than or equal to a predetermined value g (g<e) (S406). In this process, too, a heating capability requested of the air conditioner apparatus is estimated based on the degree of opening of the air-mixing damper 26 and the blower air volume, and it is determined whether the requested heating capability is higher than or equal to a predetermined level.

That is, if negative determination is made in either step S405 or step S406, it is determined that the heating capability requested of the air conditioner apparatus is higher than or equal to the predetermined level. Then, the processing of steps S408, S411 (FIG. 8) is executed. If affirmative determination is made in both step S405 and step S406, it is determined that the heating capability requested of the air conditioner apparatus is lower than the predetermined level. Then, the processing of step S407 (FIG. 8) is executed.

After step S407, it is determined whether the cooling water temperature is higher than or equal to a predetermined value b (S409). If the determination is affirmative, the lockup region is set to the region A, B (S410 in FIG. 8). If the determination is negative, the lockup region is set to the region A (S411 in FIG. 8).

This embodiment achieves substantially the same advantages as the third embodiment. The third and fourth embodiments may be modified as follows.

Although the flow control valve 6b is half-opened so as to reduce the amount of flow of engine cooling water that passes through the heat exchanger 16, the valve position of the flow control valve 6b is not limited to the half-open position, but may be suitably changed as long as the degree of valve opening is any degree of opening toward the closed side from the fully open state.

Although the external air temperature, the needed outlet temperature TAO, the degree of opening of the air-mixing damper 26, the blower air volume, etc. are adopted as parameters related to the temperature inside the cabin 25 used to estimate the heating capability requested of the air conditioner apparatus, it is also possible to adopt other parameters, such as the internal air temperature, the amount of solar radiation, etc.

Figure 10:
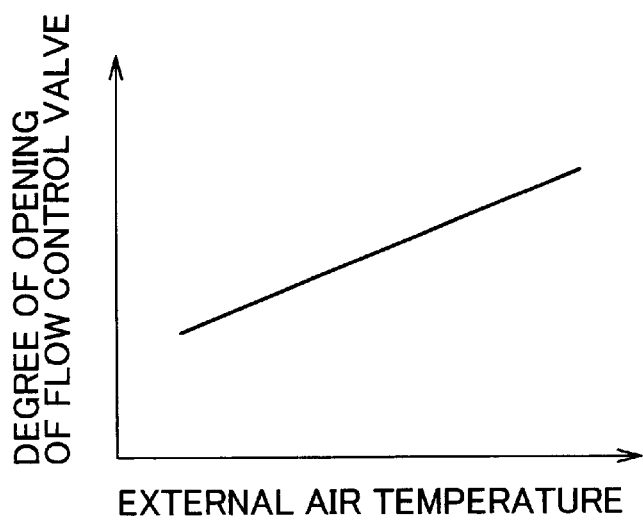
FIG. 10 is a graph indicating the manner of change in the degree of opening of a flow control valve in a case where the degree of opening of the flow control valve is linearly controlled in accordance with the external air temperature.
Figure 11:
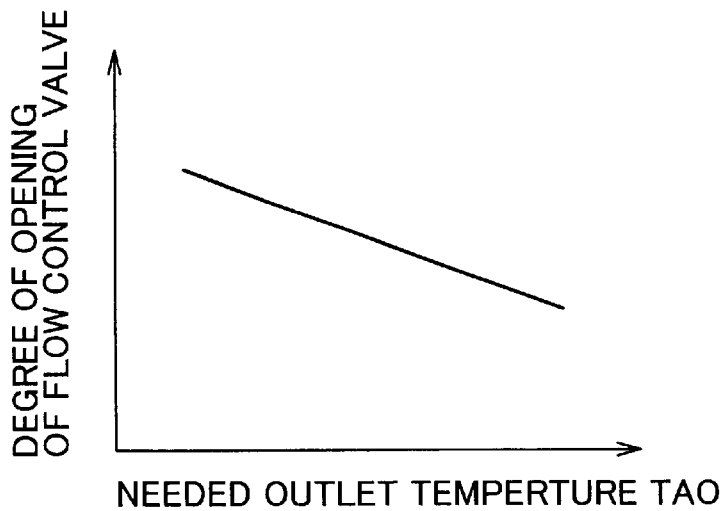
FIG. 11 is a graph indicating the manner of change in the degree of opening of the flow control valve in a case where the degree of opening of the flow control valve is linearly controlled in accordance with the needed outlet temperature.
Figure 12:
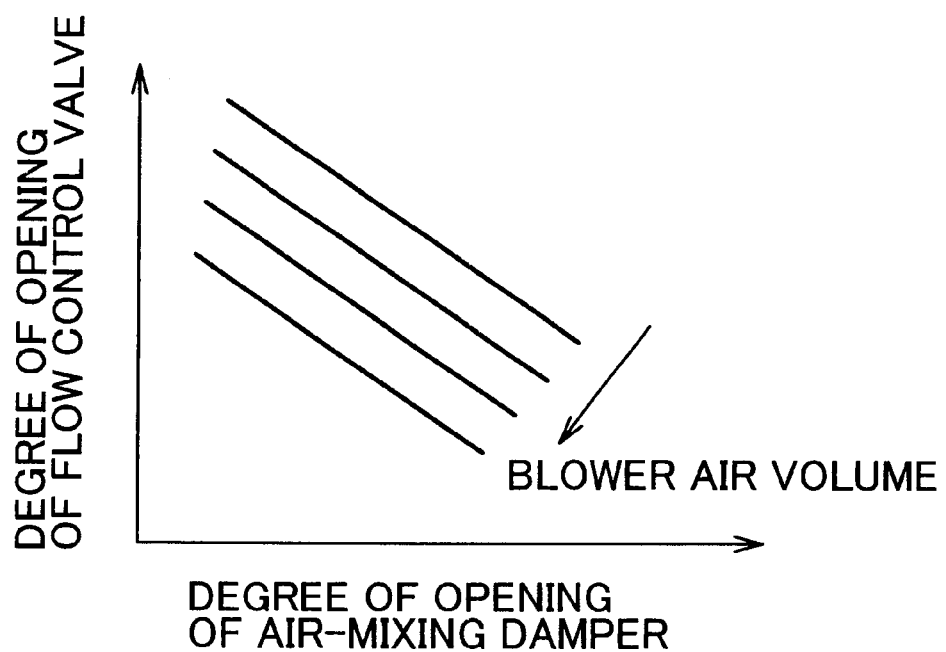
FIG. 12 is a graph indicating the manner of change in the degree of opening of the flow control valve in a case where the degree of opening of the flow control valve is linearly controlled in accordance with the degree of opening of an air mixing damper and the blower air volume.

In the embodiments, when the heating capability requested of the air conditioner apparatus is lower than a predetermined level, the amount of flow of engine cooling water that passes through the heat exchanger 16 is not reduced. When the heating capability is higher than or equal to the predetermined level, the aforementioned amount of flow of engine cooling water is reduced. However, this does not restrict the invention. That is, it is also possible to estimate a heating capability requested of the air conditioner apparatus based on the external air temperature, the needed outlet temperature TAO, the degree of opening of the air-mixing damper 26, the blower air volume, etc., and to linearly change the amount of flow of engine cooling water with respect to changes in the estimated heating capability. More specifically, for example, the degree of opening of the flow control valve 6b is reduced as the external air temperature decreases as indicated in FIG. 10. Furthermore, the degree of opening of the flow control valve 6b is reduced as the needed outlet temperature TAO increases as indicated in FIG. 11. Still further, as indicated in FIG. 12, the degree of opening of the flow control valve 6b is reduced as the degree of opening of the air-mixing damper 26 increases, and as the blower air volume increases. Due to the control of the degree of opening of the flow control valve 6b, the amount of engine cooling water that passes through the heat exchanger 16 can be gradually reduced as the heating capability requested of the air conditioner apparatus increases. Therefore, it becomes possible to achieve both an improvement in the fuel economy of the engine 1 and reliable provision of a heating capability of the air conditioner apparatus.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicular lockup clutch-equipped transmission control apparatus which is applied to a vehicle that includes a heater apparatus for heating a cabin by heat from an engine, a transmission that transfers power between the engine and a wheel, and a heat exchanger that conducts heat exchange between the engine and the transmission, and which controls a lockup clutch that is disposed between the engine and the transmission and that mechanically connects and disconnects a path of power, in accordance with a state of operation of the vehicle, the control apparatus comprising:

a controller that determines whether a heating capability requested of the heater apparatus is at least a first predetermined level based on at least one parameter related to a temperature inside the cabin, and that restricts engagement of the lockup clutch if it is determined that the heating capability requested of the heater apparatus is at least the first predetermined level.

2. The vehicular lockup clutch-equipped transmission control apparatus according to claim 1, wherein the controller restricts engagement of the lockup clutch by reducing a lockup region toward a high-vehicle speed side.

3. The vehicular lockup clutch-equipped transmission control apparatus according to claim 1, wherein the controller estimates the heating capability requested of the heater apparatus based on the at least one parameter related to the temperature inside the cabin.

4. The vehicular lockup clutch-equipped transmission control apparatus according to claim 3, wherein the at least one parameter includes the atmospheric temperature outside the vehicle.

5. The vehicular lockup clutch-equipped transmission control apparatus according to claim 3, wherein the at least one parameter includes a needed outlet temperature of the heater apparatus.

6. The vehicular lockup clutch-equipped transmission control apparatus according to claim 3, wherein the at least one parameter includes a degree of opening of an air mixing damper.

7. The vehicular lockup clutch-equipped transmission control apparatus according to claim 3, wherein the at least one parameter includes a blower air volume.

8. The vehicular lockup clutch-equipped transmission control apparatus according to claim 1, wherein the controller determines whether the heating capability requested of the heater apparatus is at least a second predetermined level based on the at least one parameter related to the temperature inside the cabin, and the controller controls an amount of flow of engine cooling water that passes through the heat exchanger, if it is determined that the heating capability requested of the heater apparatus is at least the second predetermined level.

9. The vehicular lockup clutch-equipped transmission control apparatus according to claim 8, wherein the controller linearly changes the amount of engine cooling water that passes through the heat exchanger, with respect to a change in the heating capability requested.

10. The vehicular lockup clutch-equipped transmission control apparatus according to claim 8, wherein the controller estimates the heating capability requested of the heater apparatus based on the at least one parameter related to the temperature inside the cabin.

11. The vehicular lockup clutch-equipped transmission control apparatus according to claim 10, wherein the at least one parameter includes the atmospheric temperature outside the vehicle.

12. The vehicular lockup clutch-equipped transmission control apparatus according to claim 10, wherein the at least one parameter includes a needed outlet temperature of the heater apparatus.

13. The vehicular lockup clutch-equipped transmission control apparatus according to claim 10, wherein the at least one parameter includes a degree of opening of an air mixing damper.

14. The vehicular lockup clutch-equipped transmission control apparatus according to claim 10, wherein the at least one parameter includes a blower air volume.

15. A vehicular lockup clutch-equipped transmission control method which is applied to a vehicle that includes a heater apparatus for heating a cabin by heat from an engine, a transmission that transfers power between the engine and a wheel, and a heat exchanger that conducts heat exchange between the engine and the transmission, and which controls a lockup clutch that is disposed between the engine and the transmission and that mechanically connects and disconnects a path of power, in accordance with a state of operation of the vehicle, the control method comprising:

determining whether a heating capability requested of the heater apparatus is at least a first predetermined level based on at least one parameter related to a temperature inside the cabin; and restricting engagement of the lockup clutch if it is determined that the heating capability requested of the heater apparatus is at least the first predetermined level.

16. The vehicular lockup clutch-equipped transmission control method according to claim 15, further comprising reducing a lockup region toward a high-vehicle speed side.

17. The vehicular lockup clutch-equipped transmission control method according to claim 15, further comprising:

determining whether the heating capability requested of the heater apparatus is at least a second predetermined level based on the at least one parameter related to the temperature inside the cabin; and controlling an amount of flow of engine cooling water that passes through the heat exchanger, if it is determined that the heating capability requested of the heater apparatus is at least the second predetermined level.

18. The vehicular lockup clutch-equipped transmission control method according to claim 17, further comprising changing the amount of engine cooling water that passes through the heat exchanger linearly with respect to a change in the heating capability requested.

* * * * *